March 21, 1967 R. C. CLARK 3,310,749
REVERSING COUNTER HAVING ADD-AND-SUBTRACT INPUTS EMPLOYING TIME-CONTROL MEANS TO EFFECT ANTI-COINCIDENCE UPON SIMULTANEOUS OCCURRENCE OF INPUTS
Filed April 14, 1964
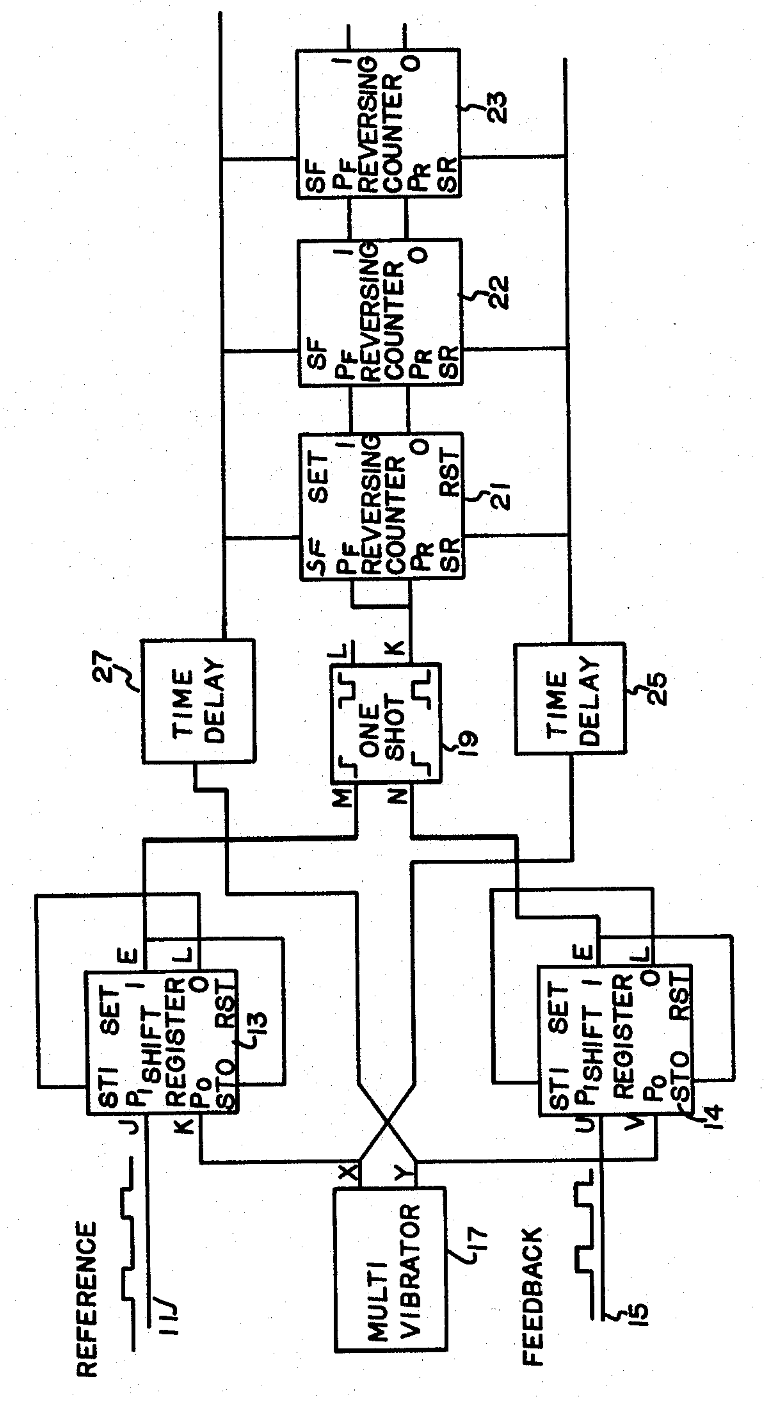
INVENTOR.
ROBERT C. CLARK
BY
J. T. Comfort
ATTORNEY 3,310,749
Patented Mar. 21, 1967

3,310,749

REVERSING COUNTER HAVING ADD-AND-SUBTRACT INPUTS EMPLOYING TIME-CONTROL MEANS TO EFFECT ANTI-COINCIDENCE UPON SIMULTANEOUS OCCURRENCE OF INPUTS

Robert C. Clark, Roanoke, Va., assignor to General Electric Company, a corporation of New York Filed Apr. 14, 1964, Ser. No. 359,603
3 Claims. (Cl. 328—44)

This invention is directed to a reversing counter, and more particularly to a reversing counter with a plurality of inputs.

Pulses from several independent inputs are at times combined in a reversing counter. For instance pulses from a feedback and from a reference may be combined in a reversing counter to determine whether the reference or the feedback pulses are being received at a faster rate. Since the reference and feedback pulses are received on independent inputs there is always the chance that a reference and feedback pulse will be received at the same time, and that only one pulse will be recorded in the reversing counter.

It is therefore an object of this invention to provide a new and improved reversing counter for combining independent inputs.

Another object of this invention is to provide a new and improved reversing counter for insuring that signals received on independent inputs will all be recorded in the reversing counter.

Accordingly the receipt of a signal sets a corresponding bistable device to a first stable state. At a predetermined time each bistable device is reset to a second stable state so that the bistable device at that time produces a signal which is recorded in the reversing counter. Each bistable device is reset at a different time.

The invention is set forth with particularity in the appended claims. The principles and characteristics of the invention, as well as other objects and advantages are revealed and discussed through the medium of the illustrative embodiments appearing in the specification and drawing which follow.

In the drawing:

The figure is a block diagram of a reversing counter constructed according to this invention.

Referring now to the figure, positive pulses may be applied to the reference input terminal 11, and to the feedback input terminal 15. The reference input terminal 11 is connected to the $P_1$ terminal of shift register bit 13, and the feedback input terminal 15 is connected to the $P_1$ terminal of shift register bit 14. The ONE output terminals of shift register bits 13 and 14 are connected to their STO terminals, and the ZERO output terminals of shift register bits 13 and 14 are connected to their STI terminals. The ONE output terminal of shift register bit 13 is connected to terminal M of ONE shot 19, and the ONE output terminal of shift register bit 14 is connected to terminal N of ONE shot 19.

Output terminal X of multivibrator 17 is connected to the $P_0$ terminal of shift register 13, and to time delay 25. Output terminal Y of multivibrator 17 is connected to the $P_0$ terminal of shift register 14, and to time delay 27. Time delays 25 and 27 are needed to allow for propagation time of the counter.

Time delay 27 is connected to the SF (count forward) terminal of reversing counter bits 21–23, and time delay 25 is connected to the SR (count in reverse) terminal of reversing counter bits 21–23.

Output terminal K of one shot 19 is connected to the PF and PR terminals of reversing counter bit 21.

The ONE output terminals of reversing counter bits 21–23 are connected to the FP input terminal of the next reversing counter bit, and the ZERO output terminals are connected to the PR input terminal. Multivibrator 17 is a free running multivibrator, with the leading edge of one-half cycle of the multivibrator produced from terminal X and the other leading edge of the other half cycle produced from terminal Y. In this manner terminal X will produce a positive pulse, while terminal Y is producing a negative pulse, and terminal X will produce a negative pulse, while terminal Y is producing a positive pulse. The pulses from the multivibrator 17 are produced at a faster rate than the pulses applied to the input terminals 11 and 15.

Shift register bits 13 and 14 are steered to a ONE state to produce a negative signal from the ONE terminal E when a positive pulse is applied to the $P_1$ terminal while a negative signal is applied to the STI (steer 1) terminal and a positive signal is applied to the STO (steer 0) terminal. They are steered to a ZERO state to produce a negative signal from the ZERO terminal L when a positive pulse is applied to the $P_0$ terminal while a negative signal is applied to the STO (steer zero) terminal, and a positive signal is applied to the STI (steer one). A shift register bit changes states on the positive going side of the pulse applied to the $P_1$ and $P_0$ terminals, and the output terminal which is negative goes positive when the shift register changes states.

One shot 19 produces a positive pulse from its output terminal K upon the application of a positive going signal to its M or N input terminals.

Reversing counter bits 21–23 change from their previous states to the opposite state upon the application of a positive going signal to their PF or PR terminals, depending on the signals applied to their SF (count forward) and SR (count in reverse) terminals. If a positive signal is applied to the SF terminal, and a negative signal is applied to the SR terminal, a positive going signal applied to the PF terminal causes the reversing counter bit to change states, while a positive going signal applied to the PR terminal has no effect. Conversely, with a positive going signal applied to the SR terminal, and a negative signal applied to the SF terminal, a positive going signal applied to the PF terminal has no effect, while a positive going signal applied to the PR terminal causes the reversing counter bit to change states.

Counter bits 21–23 are connected as a reversing counter, with the signals applied to the SF and SR terminals controlling whether the reversing counter will count forforward, or will count in reverse.

A positive signal applied to the SF terminals and a negative signal applied to the SR terminals of reversing counter bits 21–23 causes the reversing counter to count forward so that a positive going signal applied to the PF terminal causes that reversing counter bit to change states. Assume that reversing counter bits 21–23 are all reset to ZERO. The first positive going signal applied to the PF terminal of reversing counter bit 21 causes that counter bit to be set to ONE. The ZERO output terminal of reversing counter bit 21 goes positive, but that positive going signal is applied to the PR terminal of reversing counter bit 22 so it has no effect on reversing counter bit 22. The second pulse applied to reversing counter bit 21 is applied to both the PF and PR terminals, to reset that counter bit to ZERO. The ONE output terminal of reversing counter bit 21 goes positive, applying a positive signal to the PF input terminal of reversing counter bit 22 to set that counter bit to ONE. The reversing counter has thus indicated a count of two, with counter bit 21 reset to ZERO, bit 22 set to ONE, and bit 23 reset to ZERO.

A positive signal applied to the SR terminals and a negative signal applied to the SF terminals of reversing counter bits 21–23 causes the reversing counter to count in reverse, or to count down. A positive pulse applied to the reversing counter is applied to the PF and PR terminals of reversing counter 21 to cause reversing counter bit 21 to change states from ZERO to ONE. The negative signal from the ZERO output terminal of reversing counter bit 21 goes positive, applying a positive going signal to the PR terminal of reversing counter bit 22, causing reversing counter bit 22 to change from ONE to ZERO. The ZERO output terminal of counter bit 22 does not go positive, so counter bit 23 remains in the ZERO state. The second positive pulse applied to the reversing counter when the reversing counter is counting in reverse is applied to the PF and PR terminals of reversing counter bit 21 to cause reversing counter bit 21 to change states from ONE to ZERO. The output signal from the ZERO output terminal of reversing counter bit 21 goes negative, so reversing counter bit 22 does not change states. Thus after two pulses the reversing counter has counted back to ZERO.

*Operation*

Assume that a positive pulse is applied to the reference input terminal 11, applying a positive pulse to the $P_1$ terminal of shift register bit 13, when the shift register bit 13 has previously been reset to ZERO. With the shift register bit 13 reset to ZERO the ZERO output terminal applies a negative signal to its STI terminals, and the ONE output terminal applies a positive signal to its STO terminal so that the application of a positive pulse to the $P_1$ terminal steers the shift register bit to ONE.

Shift register bit 13 set to ONE applies a negative signal from its ONE terminal to its STO terminal and a positive signal from its ZERO terminal to its STI terminal, so that the next positive pulse applied to the $P_0$ terminal from the multivibrator 17 steers shift register bit 13 to ZERO, applying a positive going signal to terminal M of one shot 19. One shot 19 therefore applies a positive pulse to the combined PF and PR terminals of reversing counter bit 21. In the period before multivibrator 17 applies a positive pulse to the $P_0$ terminal of shift register bit 13 to cause the application of a positive pulse to the pulse input terminals of reversing counter bit 21, multivibrator 17 applied a positive pulse to time delay 27, causing time delay 27 to apply a delayed positive signal to the SF (count forward) terminals of reversing counter bits 21–23. The positive pulse applied to reversing counter bit 21 therefore causes the counter composed of reversing counter bits 21–23 to count up.

To demonstrate the anti-coincidence action of this invention, assume that at the same time a positive pulse is applied to the reference input terminal 11, causing the reversing counter to count up a count of one as just described, assume that a positive pulse is applied to the feedback input terminal 15. The positive pulse applied to the feedback input terminal 15 is applied to the $P_1$ input terminal of shift register bit 14.

Shift register bit 14 has been previously reset to ZERO, so that its ZERO output terminal applies a negative signal to its STI terminal and a positive signal to its STO terminal. The positive pulse applied to the $P_1$ input terminal of shift register bit 14 therefore steers shift register bit 14 to ONE. Shift register bit 14 remains set to ONE until multivibrator 17 applies a positive pulse to the $P_0$ terminal of shift register bit 14 to reset shift register bit 14 to ZERO. The positive pulse applied to shift register bit 14 is of a different half cycle than that applied to shift register bit 13, so that shift register bits 13 and 14 are never reset to ZERO at the same time.

The resetting of shift register bit 14 to ZERO causes a positive going signal to be applied to terminal N of one shot 19, so that one shot 19 applies a positive pulse to the PF and PR terminals of reversing counter bit 21. A positive pulse from multivibrator 17 was applied to time delay 25 before it was applied to the shift register bit 14, causing time delay 25 to apply a delayed positive signal to the SR (count in reverse) terminals of counter bits 21–23. The positive pulse applied to reversing count bit 21 resulting from the application of a positive pulse from multivibrator 17 causes the reversing counter to count in reverse for a count of ONE.

The application of positive pulses to the reference input terminal 11, and to the feedback input terminal 15, causes the reversing counter to count up and to count down in the manner described. The circuit described makes sure that if pulses are received at the same time on input terminal 11 and 15 one will be delayed until the other one effects a count in the reversing counter.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A counting circuit for counting input signals from a first and second independent sources comprising, first bistable means having first and second stable states responsive to an input signal from said first source to be set to its first stable state, second bistable means having first and second stable states responsive to an input signal from said second source to be set to its first stable state, means for resetting said first and second bistable means to their second stable states at diffferent times, counting means, and means responsive to the resetting of said first and second bistable means for causing a count to be registered in said counting means.

2. A counting circuit for counting input signals from first and second independent sources comprising, first bistable means having first and second stable states responsive to an input signal from said first source to be set to its first stable state, second bistable means having first and second stable states responsive to an input signal from said second source to be set to its second stable state, reversing counting means, means for resetting said first bistable means to its second stable state and controlling said reversing counting means to count in one direction and at a different period of time for resetting said second bistable means to its second stable state and controlling said reversing counting means to count in a second direction, and means responsive to the resetting of said first and second bistable means for causing a count to be registered in said reversing counting means.

3. A reversing counting means for indicating the difference between input pulses from two independent sources comprising first bistable means having first and second stable states responsive to an input signal from said first source to be set to its first stable state, second bistable means having first and second stable states responsive to an input signal from said second source to be set to its first stable state, reversing counting means for resetting said first bistable means to its second stable state and controlling said reversing counting means to count forward as said first bistable means is reset to its second stable state, and at a different time resetting second bistable means to its second stable state and controlling said reversing counting means to count in reverse as said second bistable means is reset to its second stable state, and means responsive to the resetting of said first and second bistable means for causing a count to be registered in said reversing counting means in the direction controlling by said resetting means.

References Cited by the Examiner

UNITED STATES PATENTS

| | | | |
|---|---|---|---|
| 2,867,724 | 1/1959 | Olson | 328—44 X |
| 3,192,478 | 6/1965 | Metz | 328—44 |

ARTHUR GAUSS, *Primary Examiner*.

J. S. HEYMAN, *Assistant Examiner*.